Figure 1:
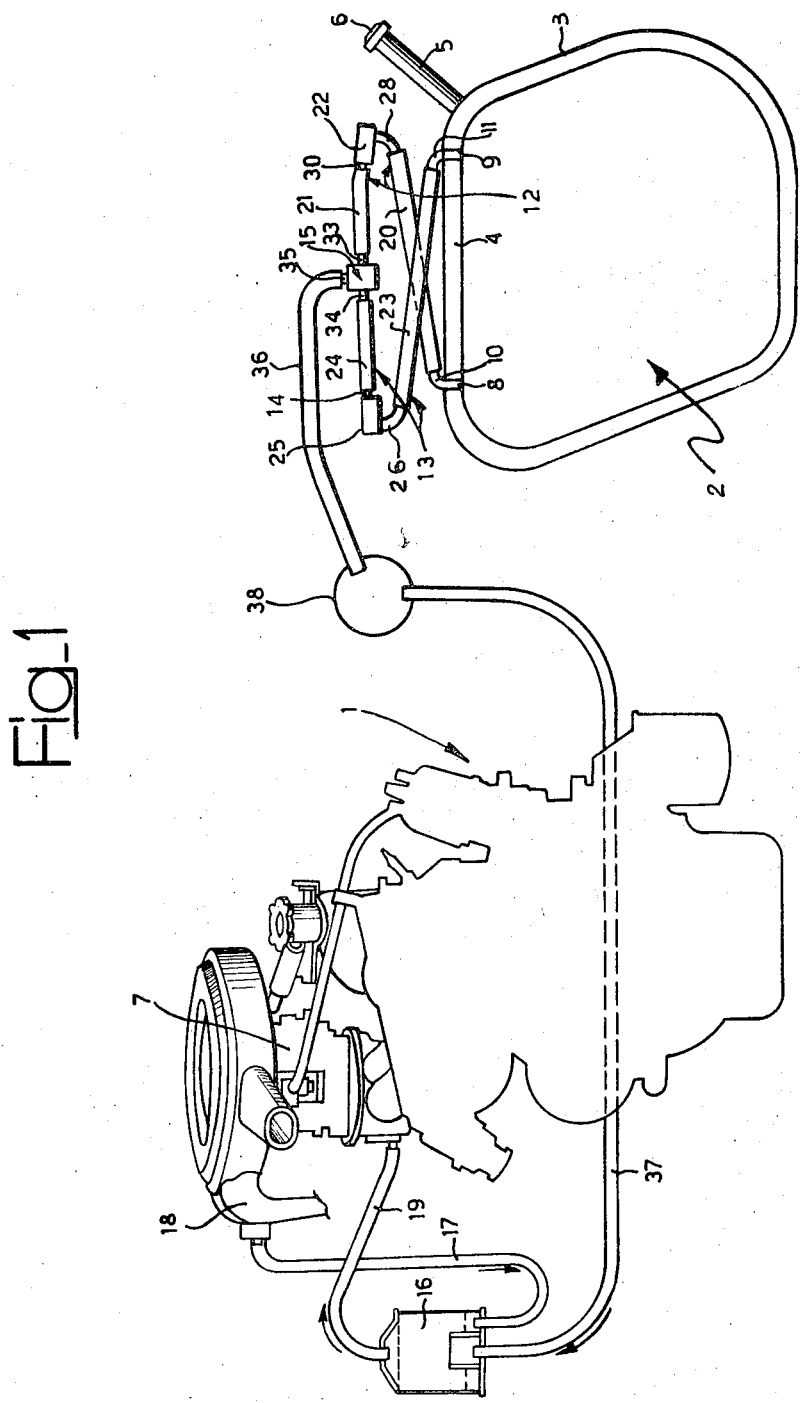

United States Patent

Torazza

[15] 3,695,243
[45] Oct. 3, 1972

[54] FUEL TANK VENTILATION IN MOTOR VEHICLES

[72] Inventor: Giovanni Torazza, Turin, Italy

[73] Assignee: Fiat Societa per Azioni, Turin, Italy

[22] Filed: Nov. 12, 1970

[21] Appl. No.: 88,733

[30] Foreign Application Priority Data

Nov. 14, 1969 Italy.....................54033 A/69

[52] U.S. Cl..............................123/136, 220/85 VR
[51] Int. Cl.........................B65d 25/00, F02m 21/00
[58] Field of Search......123/136; 220/85 VR, 85 VS, 220/86

[56] References Cited

UNITED STATES PATENTS

| | | |
|---|---|---|
| 2,412,019 | 12/1946 | Walker......................123/136 |
| 2,944,405 | 7/1960 | Basore et al...........220/85 VS |
| 3,115,114 | 12/1963 | Rapplean et al...........123/136 |
| 3,187,935 | 6/1965 | Lense.......................220/86 R |
| 3,352,294 | 11/1967 | Biller et al. ................123/136 |
| 3,542,239 | 11/1970 | Latvala .................220/85 VR |

*Primary Examiner*—Laurence M. Goodridge
*Assistant Examiner*—Cort R. Flint
*Attorney*—Sughrue, Rothwell, Mion, Zinn & Macpeak

[57] ABSTRACT

A ventilation system for the fuel tank of a motor vehicle, wherein the fuel tank has a plurality of holes in its upper surface. Each hole is connected to a manifold by a two-part tube, each tube having a container of enlarged diameter between its first and second parts. The two parts of the tube are inclined relative to each other, with the first part being inclined upwards from one side of the tank to the other. The manifold is, in turn, connected to a fuel vapor trap.

3 Claims, 2 Drawing Figures

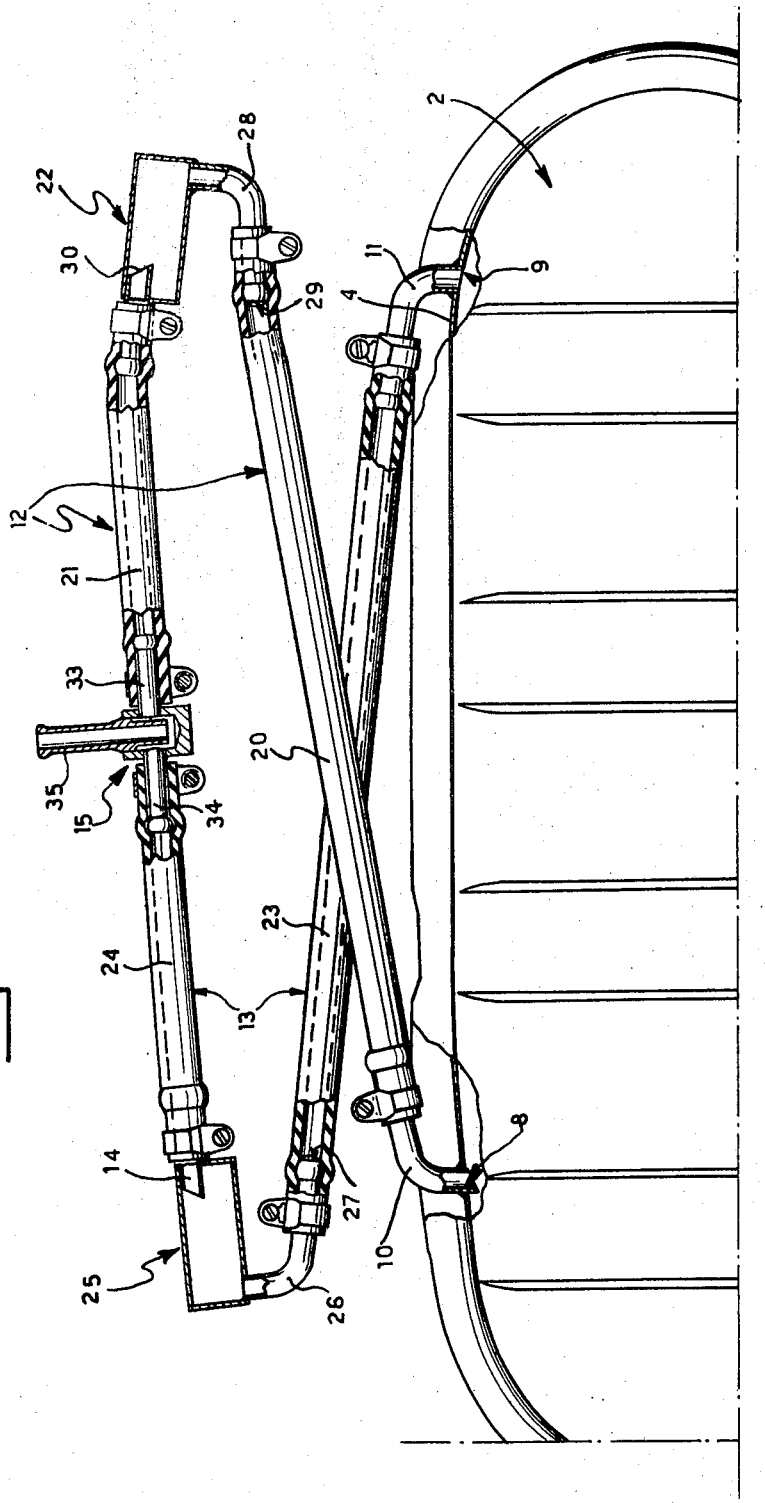

FUEL TANK VENTILATION IN MOTOR VEHICLES

This invention relates to the ventilation of the fuel tank of a motor vehicle.

Research on atmospheric pollution has shown that it is highly desirable to prevent the escape of fuel vapor from the tank to the atmosphere. Legislation has been introduced in the United States of America to make it compulsory in certain areas to have a trap preventing the escape of fuel vapor from the tank, and various forms of trapping systems have been proposed.

Among the forms proposed, it is common to have a fuel tank with a plurality of holes in its upper surface, spaced apart from each other so that in any condition of the vehicle during normal driving, and with the tank filled to the maximum, at least one of the holes is free from fuel. All the holes are connected by separate tubes to a container which should be located sufficiently high above the tank to ensure that the container will never be flooded with liquid fuel during normal driving. The container acts as a manifold, being connected by a duct to a trap canister containing a fuel vapor trapping material such as activated carbon. Air is circulated through the canister to draw fuel vapor out of the trap and into the air stream feeding the engine. A valve that is normally closed to the atmosphere is inserted in the system to allow the entry of air from the atmosphere when there is an under-pressure in the tank. The valve also allows gas to escape from the tank to the atmosphere in the event of dangerous and sudden over-pressure, caused by an event such as collapse of the tank in a collision.

When the vehicle is unused for a substantial period, vapor collects in the trap and is purged by air circulating through it when the engine is next started.

With a vapor trap system such as this, it is essential to prevent fuel in liquid form from reaching the trap since it would render the trapping material useless. For this reason the manifold should be as high as possible above the tank. However, practical considerations set a limit on this height, particularly when the fuel tank is in any event directly below the bonnet of an automobile.

An object of the invention is to alleviate this problem and make it unnecessary to have a tall space above the fuel tank to receive the tubes and manifold.

The invention provides a motor vehicle having a fuel tank with a plurality of holes spaced apart in its upper surface, a tube leading from each hole to a manifold, a fuel vapor trap connected by a duct to the manifold, purging means to pass air through the trap, an engine to which the purging air is fed, and normally closed valve means to control the communication of the tank with the atmosphere, the improvement residing in that each tube connecting a hole in the tank to the manifold comprises a first part and a second part inclined to each other, the first part extending slantingly upwardly from the hole to a point above the tank substantially opposite that hole, and including a container connected in each such tube between its first and second parts, the container having a diameter larger than that of the tube.

In the drawings:

FIG. 1 is a diagrammatic illustration of arrangements for ventilating the fuel tank of a motor vehicle; and FIG. 2 is a view on an enlarged scale, partly in section and partly in elevation, of the arrangements at the upper part of the fuel tank of FIG. 1.

In FIG. 1, an internal combustion engine 1 of a motor vehicle is supplied with fuel from a tank 2. For filling, the tank 2 has an upwardly extending tube 5 connected to a side wall 3 and closed at its top by an airtight cap 6. The tank 2 is connected to a carburettor 7 through ducts that are not shown.

Two holes 8 and 9 are formed in the upper surface 4 of the tank 2 near opposite edges of this surface. The hole 8 is connected by a tube 12 to a manifold 15, and the hole 9 is connected to the same manifold by a tube 13.

The tube 12 has a first part in the form of an elbow tube 10 and a rectilinear tube 20 clamped to each other, the elbow tube 10 being fixed in the hole 8, and a further elbow tube 28. The first part 10, 20, 28 of the tube 12 slants upwards from the tube 8 to a point above the tank 2 opposite the side where the hole 8 is formed. The elbow tube 28 connects the tube 12 to a container 22 of cylindrical shape, whose axis slopes obliquely to the horizontal. The elbow tube 28 enters this container at the lowest point on the container. A constriction 29 is formed at the lower tip of the elbow tube 28 below a bulbous and portion which facilitates clamping of the tube 23, the constriction serving to reduce the thrust of any liquid fuel which may reach so far up the tube 12.

At its uppermost point the container 22, which is of considerably larger diameter than the tube 12, is entered by a short rectilinear tube 30, to which is connected another rectilinear tube 21. The tubes 21 and 30 form a second part of the tube 12, inclined at an angle to the first part. The second part 21, 30 is connected to a spigot 33 of the manifold 15.

The hole 9 is connected analogously to the manifold 15. The tube 13 has a first upwardly slanting part crossing the first part of the tube 12 and comprising an elbow tube 11, rectilinear tube 23 and further elbow tube 26. There is a constriction 27 in the elbow tube 26. A container 25 is connected to the elbow tube 26 and to a short tube 14 which, with a rectilinear tube 24, forms the second part of the tube 13, inclined at an acute angle to the first part. The tube 24 is connected to a spigot 34 of the manifold 15. The axes of the containers 22, 25 converge upwardly to a point approximately above the center of the tank 2.

A third spigot 35 of the manifold 15 is connected by a tube 36 to a valve 38 which is of known construction and is shown only diagrammatically. As is known in the art, this valve is normally closed to the atmosphere but opens to admit air from the atmosphere through a one-way filtered orifice when there is an under-pressure in the tank 2. The valve also allows the escape of vapor from the tank to the atmosphere when there is a sudden severe over-pressure caused by an event such as an accident collapsing the tank 2. For a very slight over-pressure in the tank 2, the valve 38 allows vapor from the tank to pass through a tube 38 to a fuel vapor trap 16 of known construction, containing a trapping material such as activated carbon. The trap 16 is purged by air entering it through a tube 17 issuing from the air filter outlet 18 of the engine 1. Vapor-laden air leaves the trap 16 through a tube 19 to be admitted to the intake manifold of the carburettor 7.

By means of the ventilation arrangements of the invention it is always possible to control the ventilation of the tank 2 even if there is not enough space above or to one side of the tank 2 for the installation of a single container that can never be reached by liquid fuel in any normal condition of the vehicle. The two containers 22 and 25 are in fact arranged above the tank 2 but neither is vertically above the hole 8 or 9 to which it is connected, being transposed to the side of the tank opposite that hole.

The slope of the sections 20 and 23 of the tubes 12 and 13 is such that containers 22 and 25 are located as far as possible, horizontally, from the hole 8 or 9 to which they are connected. Thus even if liquid fuel enters one of the holes, it will not enter the container connected to that hole. Even if fuel should by chance enter one of the containers, the slope of the container will cause the fuel to return to the tank as soon as the condition of the vehicle returns to normal. Moreover, liquid fuel entering one of the containers cannot pass further unless the fuel reaches the level in the container of the inwardly projecting end of the tube 30 or 14 connected to the uppermost point in the container. In order to ensure that this cannot occur, the capacity of each container 22 or 25 should be slightly greater than the capacity of the first part 20 and 23 of the tube 12 or 13 to which it is connected. In this way, each container could in extreme conditions accommodate the liquid fuel which with abrupt dynamic forces might introduce into the first half of the relevant tube and subsequently into the container.

To ensure that any liquid entering a container 22 or 25 will not be travelling at an excessive speed, the constrictions 27, 29 are located as close as is feasible to the containers.

I claim:

1. In a motor vehicle having a liquid fuel tank provided with vapor ventilation means including a vapor collection manifold, a fuel vapor trap connected by a duct to the manifold, purging means to pass air through the trap, an engine to which the purging air is fed, and normally closed valve means to control the communication of the tank with the atmosphere, the improvement comprising said manifold being located above a central region of an upper wall of the tank, and the vapor ventilation means further comprising a plurality of tube means leading through the upper wall of the tank in at least two remotely spaced points on opposite sides of the tank, each of said tube means comprising:
  a. a first tube part extending slantingly upwards from one of said points towards a further point above the opposite side of the tank,
  b. a container having a volume slightly greater than the volume of said first tube part located at said further point, said first tube part opening into the bottom of said container, and
  c. a second tube part opening into the top of said container and connected between said container and said manifold, whereby the tube means connecting the tank with the manifold each have two parts extending in opposite directions to each other.

2. The improvement as set forth in claim 1, wherein each container is of an elongated configuration and is positioned with its longitudinal axis inclined relative to a horizontal plane, the opening of said first tube part into said container being lower than the opening of said second tube part into said container.

3. The improvement as set forth in claim 1, wherein each tube means includes a constriction in its first tube part adjacent the container connected therewith.

* * * * *